(12) United States Patent
Saneyoshi (10) Patent No.: US 11,865,483 B2
(45) Date of Patent: Jan. 9, 2024

(54) STATE ESTIMATION APPARATUS, METHOD, AND PROGRAM RECORDING MEDIUM

(71) Applicant: NEC Corporation, Tokyo (JP)

(72) Inventor: Eisuke Saneyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 253 days.

(21) Appl. No.: 17/417,479

(22) PCT Filed: Dec. 26, 2018

(86) PCT No.: PCT/JP2018/047838
§ 371 (c)(1),
(2) Date: Jun. 23, 2021

(87) PCT Pub. No.: WO2020/136756
PCT Pub. Date: Jul. 2, 2020

(65) Prior Publication Data
US 2022/0072463 A1 Mar. 10, 2022

(51) Int. Cl.
*B01D 46/00* (2022.01)
*A47F 3/04* (2006.01)
*F25D 17/04* (2006.01)

(52) U.S. Cl.
CPC ........ *B01D 46/0086* (2013.01); *A47F 3/0478* (2013.01); *F25D 17/042* (2013.01)

(58) Field of Classification Search
CPC .. B01D 46/0086; A47F 3/0478; A47F 3/0482; F25D 17/042; F25D 23/003; F25B 47/022; F25B 2700/15
See application file for complete search history.

(56) References Cited

U.S. PATENT DOCUMENTS

2003/0024683 A1*  2/2003  Nagai ............... G02F 1/133385
                                                        165/200
2003/0217560 A1   11/2003  Kasuya et al.
(Continued)

FOREIGN PATENT DOCUMENTS

CN    101153727 A  *  4/2008  ............... A61L 9/00
JP    H01-134838 U     9/1989
(Continued)

OTHER PUBLICATIONS

International Search Report for PCT Application No. PCT/JP2018/047838, dated Feb. 19, 2019.
(Continued)

*Primary Examiner* — Emmanuel E Duke (57) ABSTRACT

A state estimation apparatus acquires current information at a power supply part of a refrigeration/freezing facility, derives a degree of change in current information acquired at a state estimation practice time point and derives a degree of change with respect to at least one pair of pieces of current information out of current information acquired at a predetermined time interval before state estimation is practiced, determines whether or not cleaning of the filter of the refrigeration/freezing facility has been practiced, based on the degree of change with respect to at least one pair of pieces of the current information and the degree of change in the current information acquired at the state estimation practice time point.

12 Claims, 6 Drawing Sheets

(56) References Cited

U.S. PATENT DOCUMENTS

| | | | |
|---|---|---|---|
| 2011/0295524 A1 | 12/2011 | Tada et al. | |
| 2015/0330650 A1* | 11/2015 | Abiprojo | F24F 11/39 700/276 |
| 2015/0330861 A1* | 11/2015 | Alsaleem | F24F 11/49 702/183 |
| 2021/0076846 A1 | 3/2021 | Saneyoshi | |

FOREIGN PATENT DOCUMENTS

| | | |
|---|---|---|
| JP | H05-076713 A | 3/1993 |
| JP | H07-262766 A | 10/1995 |
| JP | H08-257332 A | 10/1996 |
| JP | 2002-147863 A | 5/2002 |
| JP | 2003-207188 A | 7/2003 |
| JP | 2004-045018 A | 2/2004 |
| JP | 2005-106323 A | 4/2005 |
| JP | 2006-097957 A | 4/2006 |
| JP | H11-019679 A | 4/2006 |
| JP | 2006-288513 A | 10/2006 |
| JP | 2008-151452 A | 7/2008 |
| JP | 2008-262033 A | 10/2008 |
| JP | 2011-249522 A | 12/2011 |
| JP | 2014-066446 A | 4/2014 |
| JP | 2016-223711 A | 12/2016 |
| JP | 2018-091591 A | 6/2018 |
| JP | 6365797 B | 10/2019 |
| KR | 2018-0069263 A | 6/2018 |

OTHER PUBLICATIONS

English translation of Written opinion for PCT Application No. PCT/JP2018/047838, dated Feb. 19, 2019.

\* cited by examiner

STATE ESTIMATION APPARATUS, METHOD, AND PROGRAM RECORDING MEDIUM

This application is a National Stage Entry of PCT/JP2018/047838 filed on Dec. 26, 2018, the contents of all of which are incorporated herein by reference, in their entirety.

TECHNICAL FIELD

The present invention relates to a state estimation apparatus, method, and program recording medium.

BACKGROUND

A convenience store and a supermarket are equipped with many refrigeration/freezing facilities (e.g., freezer showcases) displaying refrigerated and frozen foods.

Figure 1:
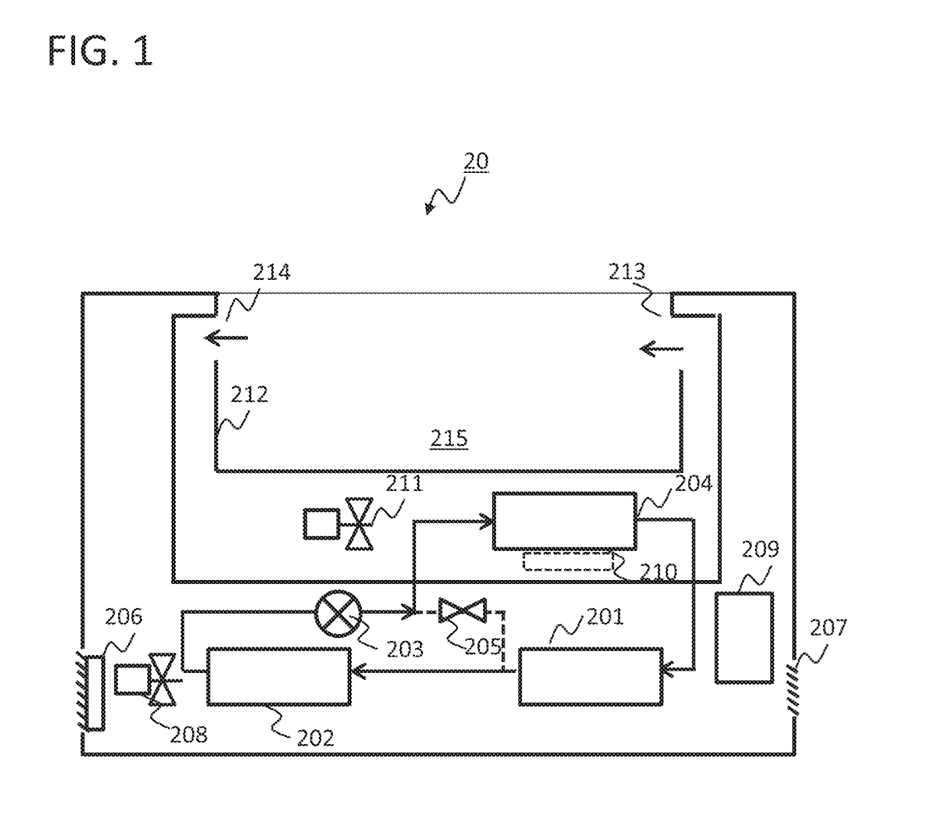
FIG. 1 is a drawing illustrating the configuration of a freezer showcase.

For example, Patent Literature (PTL) 1 and PTL 2 describe an example of a freezer showcase. FIG. 1 is a diagram schematically illustrating a configuration example of a flat open showcase.

In FIG. 1, a supply port 213 at one end of an air duct 212 feeds cold air to an open showcase 215. A suction port 214 at the other end of the air duct 212 sucks in (high temperature) air. An air blower 211 blows low-temperature air heat-exchanged by an evaporator 204 for output from the supply port 213. As a result of heat exchange in the evaporator 204, refrigerant (liquid) is vaporized, and low-pressure gas is fed to a compressor 201. The low-pressure gas is compressed by the compressor 201 and becomes high-temperature and high-pressure gas. The high-temperature and high-pressure gas from the compressor 201 is supplied to a condenser 202 which performs heat exchange of the high-temperature and high-pressure gas with low-temperature water to produce a high-pressure liquid. The high-pressure liquid is expanded by an expander 203 to become a low-pressure liquid. The low-pressure liquid from the expander 203 is supplied to the evaporator 204. That is, the compressor 201, the condenser 202, the expander 203 and the evaporator 204 constitute a refrigeration cycle.

During defrosting operation of the evaporator 204, a bypass valve 205 is opened and a high-temperature and high-pressure gas from the compressor 201 is fed to the evaporator 204. In a case of a heater type, a defrosting heater 210 is turned on during defrosting operation. In a machine room provided underneath the open showcase 215, cooling equipment inclusive of the compressor 201 and the condenser 202 forming a refrigeration cycle, an air blower 208 that cools the condenser 202, a control apparatus 209, etc., are installed. An outside air intake for sucking outside air is formed on one side wall of the machine room and a heat vent 207 is formed on the other side wall. Close to the outside air intake, an air filter 206 (also referred to as a "condenser filter" or simply "filter") for filtering dust is arranged detachably. On the side of the suction port 214 inside the air duct 212, an air speedometer or the like is sometimes provided to monitor ventilation between the supply port 213 and the suction port 214. In the configuration example of FIG. 1, a temperature sensor (not illustrated in the drawing) is provided in the open showcase 215 or near the supply port 213 inside the air duct 212, and the control apparatus 209 controls temperature control operation (ON/OFF control of the cooling operation).

A most common cause of failure of the freezer showcase 20 is said to be clogging of the filter of the air-cooled condenser (capacitor) 202. When the filter 206 is clogged with dust and debris, a cooling capacity decreases and a power supply current during operation of the freezer showcase 20 increases. If the filter 206 continues to be left uncleaned, it will cause a failure of the freezer showcase 20. For this reason, it is necessary to clean the filter 206 when using the freezer showcase 20. For example, it is generally recommended by vendors of the freezer showcase 20 to clean the filter periodically, about once every one to two weeks. However, the filter 206 is close to a store floor, and progress of clogging of the filter varies depending on a store environment, number of visiting customers, and other factors. Furthermore, there are many cases where store employees and part-time workers neglect to clean the filter.

Various methods for notifying when a filter should be cleaned for apparatuses other than a refrigeration/freezing facility also have been disclosed.

PTL 3 discloses a method for determining when to clean an air filter of a cooling mechanism of an optical drive system. Time a drive is operated by a power source is accumulated, and when a predetermined amount of time is reached, a notification to clean (or replace) the air filter is given.

PTL 4 discloses a method for detecting filter clogging using light in an air conditioner such as an air purifier or air-cooling and heating apparatus. By appropriately positioning light emitting/receiving parts with respect to a filter and air flow, a change of transmittance can be detected accurately and filter clogging can be detected reliably.

PTL 5 discloses a problem that since a rotation speed of a fan or motor varies depending on an ambient temperature a motor winding temperature, and a power supply voltage, detection of filter clogging by using only a rotation speed of a fan or motor results in a large error. In order to solve the problem, PTL 5 discloses a method that determines whether a filter of a ventilation blower is clogged by measuring a differential pressure across the filter.

PTL 6 discloses a method for detection a cleaning time of an air filter of an air conditioner. Whether an air filter is normal or clogged is determined based on relationship between an amount of air passing through the air filter and a fan speed (or a control value thereof). The method disclosed in PTL 6, however, requires an additional sensor to be installed in a facility. Therefore, it is difficult to implement this method for a freezer showcase used in a store.

PTL 7 discloses an overheat protection apparatus and a projector that can determine a usage environment of a device by measuring an outside temperature and an external atmospheric pressure at which the device is used, control a rotation speed of a cooling fan, turn off power, and issue a notification prompting a user to clean or replace an air filter according to the usage environment by accurately determining a degree of the air filter.

PTL 8 discloses a floor cleaner with a function of detecting filter clogging, devised to reduce cost, enabling detection of filter clogging without using a device such as a pressure sensor by measuring a current value of a blower in a specific operation and detecting filter clogging based on a change in current caused by filter clogging. Since a fan is an only device that uses current in the method of PTL 8, a sensor that measures a current value of the fan only is required in the facility in order to implement the method for a refrigeration/freezing facility. It is difficult to implement this method for a refrigeration/freezing facility used in a store.

PTL 9 disclose a method for calculating a degree of priority with respect to filter cleaning from an internal temperature and an operating condition of a showcase. A load factor of a showcase is calculated from internal diagnostic information and operation control information of the showcase, and a degree of uncleanness of a cooling apparatus is determined from the load factor. Accessing the internal diagnostic information, however, will require cooperation from a manufacturer of the refrigeration/freezing facility, and also require a device for collecting information.

Further, PTL 10 discloses a configuration that includes an air filter enabling ventilation between a housing part and a space outside the housing part, a power consumption detection part that detects power consumption of an apparatus to be cooled, a rotational speed detection part that detects a rotational speed of an air blower, and a mounting density calculation part that calculates a mounting density of parts of the apparatus to be cooled, and when the power consumption is not above a predetermined threshold value, the rotational speed of the air blower is within a predetermined range, and a difference in temperature between the inside and the outside of the housing part exceeds a predetermined threshold value that depends on the mounting density and the power consumption, it is determined that the air filter is clogged. PTL 10 also requires additional parts like the rotational speed detection part for the air blower, the mounting density calculation part, etc., on top of the power consumption detection part.

PTL 11 discloses a state estimation apparatus including a current information acquisition part that acquires current information of a power supply part of a refrigeration/freezing facility, a current information storage part that stores current information acquired when a refrigeration/freezing facility is in a normal state, an evaluation part that derives a degree of change in acquired current information from the current information acquired when the refrigeration/freezing facility is in a normal state, a filter cleaning determination part that estimates a clogged state of a filter of the refrigeration/freezing facility based on the degree of change and determines whether or not the filter needs to be cleaned, and an output part that outputs a determination result that the filter needs to be cleaned.

According to PTL 12, when a filter of a fan motor is clean, a large amount of air passes through it because an air resistance of the filter is low, a load on a fan motor increases, and a current value I0 is large. As the filter is clogged, the amount of air passing through the filter decreases, reducing the load on the fan motor, and the current value thereof decreases like I1. PTL 12 discloses a configuration in which a current detection circuit of the fan motor detects this current value I1, a current comparison circuit compares I1 with the current value I0 when the filter is clean, a display circuit is activated when an amount of change exceeds a predetermined value, and a display part displays a notification that the filter should be replaced.

PTL 1: Japanese Unexamined Patent Application Publication No. JP2004-45018A
PTL 2: Japanese Unexamined Patent Application Publication No. JP2008-151452A
PTL 3: Japanese Unexamined Patent Application Publication No. JP07-262766A
PTL 4: Japanese Unexamined Patent Application Publication No. JP2014-066446A
PTL 5: Japanese Unexamined Patent Application Publication No. JP2005-106323A
PTL 6: Japanese Unexamined Patent Application Publication No. JP08-257332A
PTL 7: Japanese Unexamined Patent Application Publication No. JP2008-262033A
PTL 8: Japanese Unexamined Patent Application Publication No. JP2006-288513A
PTL 9: Japanese Unexamined Patent Application Publication No. JP2016-223711A
PTL 10: Japanese Unexamined Patent Application Publication No. JP2011-249522A
PTL 11: Japanese Patent No. 6365797
PTL 12: Japanese Unexamined Patent Application Publication No. JP05-76713A

SUMMARY

The following is an analysis of the related technologies. Depending on installation environment, etc., a time (period) in which a clogged state of a filters of a refrigeration/freezing facility such as a freezer showcase reaches the time for filter cleaning differs. Therefore, in order to determine whether a filter of a refrigeration/freezing facility such as a freezer showcase has actually been cleaned, it is necessary to monitor and grasp a clogging state of the filter, set a threshold value in advance, and detect that clogging of the filter has been cleared.

In the related technologies, implementing a system monitoring a clogging state of a filter requires modification or remodeling of an existing refrigeration/freezing facility and a management system thereof.

As an example, if a filter clogging status is to be monitored by setting a threshold value in consideration of an installation environment of a refrigeration/freezing facility, a sensor or the like to acquire the installation environment (external environment) must be installed separately.

It is extremely difficult to modify or remodel a refrigeration/freezing facility such as a freezer showcase already installed in supermarkets and convenience stores that expand area wide or nationwide. That is, in a customer store or the like in which a refrigeration/freezing facility is installed, it is difficult to facilitate and promote implementation of a system which monitors that a filter has been cleaned.

The present invention was invented in consideration of the above issues and it is an object thereof to provide an apparatus, method, and program recording medium, each, enabling to simplify monitoring of cleaning of a filter of a refrigeration/freezing facility in a customer store, for example, that the refrigeration/freezing facility is installed, without modification or remodeling of the refrigeration/freezing facility and without a sensor for acquiring an environmental information.

According to an aspect of the present invention, there is provided a state estimation apparatus including: a current information acquisition part that acquires current information at a power supply part of a refrigeration/freezing facility; a current information storage part that stores current information of the refrigeration/freezing facility acquired in a state where a filter of the refrigeration/freezing facility is clean and current information of the refrigeration/freezing facility acquired once or a plurality of times at a predetermined time interval before state estimation is practiced; an evaluation part that derives a degree of change in the current information acquired at a state estimation practice time point based on the current information acquired at the state estimation practice time point and the current information retained in the current information storage part and further derives a degree of change with respect to at least one pair of pieces of the current information out of the current information retained in the current information storage part; a filter-cleaning practice judgement part that determines whether or not cleaning of the filter of the refrigeration/freezing facility has been practiced, based on the degree of change in the current information acquired at the state estimation practice time point and the degree of change with regard to at least a pair of the current information out of the current information retained in the current information storage part; and an output part that outputs the determination result.

According to an aspect of the present invention, there is provided a state estimation method including:
acquiring current information at a power supply part of a refrigeration/freezing facility;
storing in a storage part current information of the refrigeration/freezing facility acquired in a state where a filter of the refrigeration/freezing facility is clean after the filter has been cleaned and current information acquired once or a plurality of times at a predetermined time interval after the filter is cleaned and before state estimation is practiced;
deriving a degree of change in the current information acquired at a state estimation practice time point based on the current information acquired at the state estimation practice time point and the current information retained in the storage part and further deriving a degree of change with respect to at least one pair of pieces of the current information out of the current information retained in the current information storage part; and
determining whether or not cleaning of the filter of the refrigeration/freezing facility has been practiced, based on the degree of change in the current information acquired at the state estimation practice time point and the degree of change with respect to at least one pair of pieces of the current information out of the current information retained in the storage part.

According to an aspect of the present invention, there is provided a program causing a computer to execute processing comprising:
acquiring current information at a power supply part of a refrigeration/freezing facility;
storing in a storage part current information of the refrigeration/freezing facility acquired in a state where a filter of the refrigeration/freezing facility is clean after the filter has been cleaned and current information acquired once or a plurality of times at a predetermined time interval after the filter is cleaned and before state estimation is practiced;
deriving a degree of change in the current information acquired at a state estimation practice time point based on the current information acquired at the state estimation practice time point and the current information retained in the storage part and further deriving a degree of change with respect to at least one pair of pieces of the current information out of the current information retained in the current information storage part; and
determining whether or not cleaning of the filter of the refrigeration/freezing facility has been practiced, based on the degree of change in the current information acquired at the state estimation practice time point and the degree of change with respect to at least one pair of pieces of the current information out of the current information retained in the storage part.

According to an aspect of the present invention, there is provided a computer-readable program recording medium (e.g., a semiconductor storage such as RAM (Random Access Memory), ROM (Read-Only Memory), and EEPROM (Electrically Erasable and Programmable ROM), and a non-transitory recording medium such as HDD (Hard Disk Drive), CD (Compact Disc), and DVD (Digital Versatile Disc)) storing a program that causes a computer to execute processing comprising:
acquiring current information at a power supply part of a refrigeration/freezing facility;
storing in a storage part current information of the refrigeration/freezing facility acquired in a state where a filter of the refrigeration/freezing facility is clean after the filter has been cleaned and current information acquired once or a plurality of times at a predetermined time interval after the filter is cleaned and before state estimation is practiced;
deriving a degree of change in the current information acquired at a state estimation practice time point based on the current information acquired at the state estimation practice time point and the current information retained in the storage part and further deriving a degree of change with respect to at least one pair of pieces of the current information out of the current information retained in the current information storage part; and
determining whether or not cleaning of the filter of the refrigeration/freezing facility has been practiced, based on the degree of change in the current information acquired at the state estimation practice time point and the degree of change with respect to at least one pair of pieces of the current information out of the current information retained in the storage part.

According to the present invention, the modification or remodeling of a refrigeration/freezing facility or a sensor for acquiring the environmental information is not required, and the monitoring of the cleaning of the filter of, for example, a refrigeration/freezing facility can be simplified at a store that already has the refrigeration/freezing facility installed.

DETAILED DESCRIPTION

One mode of the present invention will be described. According to one of modes of the present invention, a state estimation apparatus (e.g., a processor connected to a memory) executes the following processing.

Acquiring current information from a power supply part (e.g., a distribution board, power strip, etc.) of a refrigeration/freezing facility, and storing current information acquired in a state where a filter of the refrigeration/freezing facility is clean immediately after the filter has been cleaned, and storing current information acquired at a predetermined time interval before a time point when it is determined whether or not cleaning of the filter has been practiced (termed as a state estimation practice time point) in a current information storage part.

Deriving a degree of change in current information acquired at the state estimation practice time point, based on the current information acquired at a time point when it is determined whether or not the filter has been cleaned (the state estimation practice time point) and the current information retained in the current information storage part (or based on at least one piece of the current information) and further deriving a degree of change with respect to at least one pair of pieces of the current information out of the current information retained in the current information storage part.

Determining whether or not cleaning of the filter of the refrigeration/freezing facility has been practiced, based on the degree of change with respect to at least one pair of pieces of the current information out of the current information retained in the current information storage part and the degree of change in the current information acquired at the state estimation practice time point.

According to a mode of the present invention, whether or not a filter (e.g., a condenser filter) of a refrigeration/freezing facility has been cleaned can be determined simply by measuring current information. That is, it is possible to implement estimation regarding whether or not cleaning of the filter of the refrigeration/freezing facility has been practiced, on a side of a management system (management server) that manages, for example, an electric energy of a store. Further, according to a mode of the present invention, modification or remodeling of the refrigeration/freezing facility such as installing a sensor (pressure sensor or temperature sensor) for acquiring environmental information of the refrigeration/freezing facility is not required. As a result, it becomes possible to simplify determining whether or not a filter of a refrigeration/freezing facility has been cleaned in a store with the refrigeration/freezing facility installed therein.

Further, in PTL 11, when a clogging state of a filter of a refrigeration/freezing facility is estimated based on a degree of change in current information of the refrigeration/freezing facility, acquired current information is compared with a reference value. On the other hand, according to a mode of the present invention, it is determined whether or not a filter of the refrigeration/freezing facility has been cleaned by comparing a degree of change between current information acquired at a state estimation practice time point and current information retained in the current information storage part, with a degree of change in current information acquired at different times retained in the current information storage part and thus a reference value such as the one in PTL 11 is not needed.

Example Embodiment 1

Figure 2:
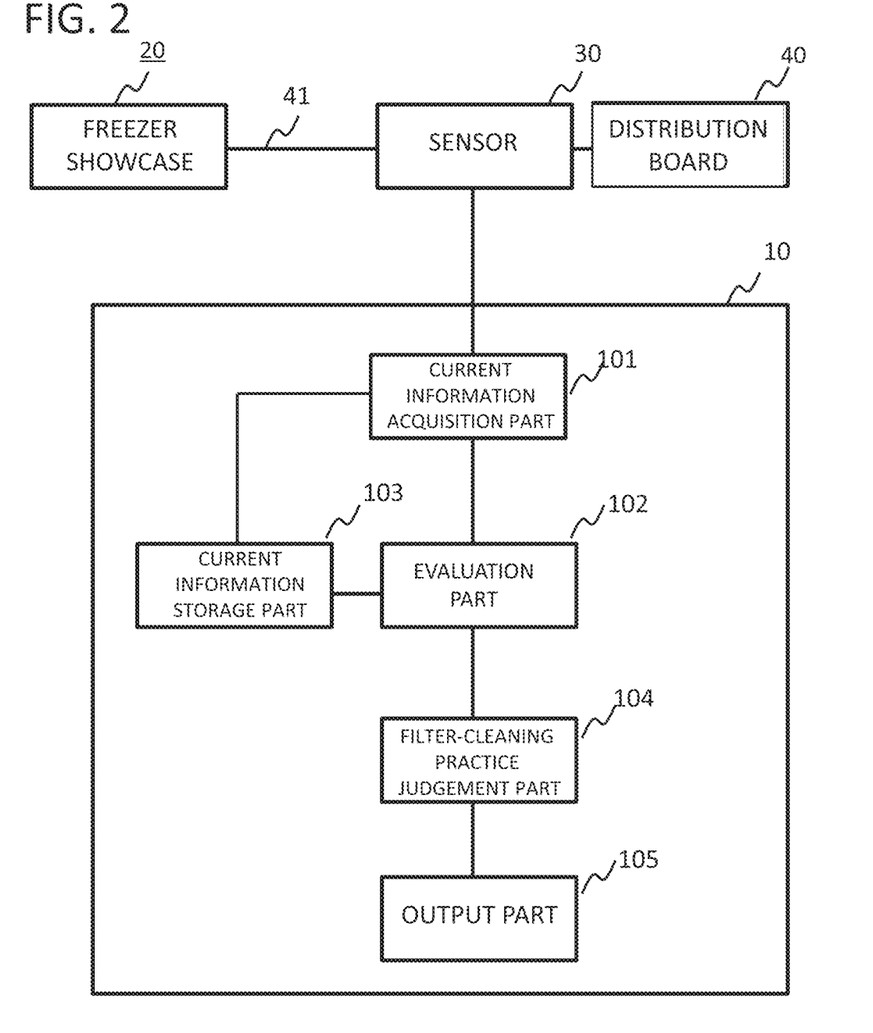
FIG. 2 is a drawing illustrating the configuration of an example embodiment of the present invention.

FIG. 2 is a diagram illustrating Example Embodiment 1 of the present invention. The freezer showcase 20 described with reference to FIG. 1 will be used as an example of a refrigeration/freezing facility (a refrigeration/freezing facility, however, is not limited to a freezer showcase). The following describes an example embodiment, also with reference to FIG. 1 as appropriate.

In FIG. 2, a sensor 30 acquires information of current flowing through a power supply part of the freezer showcase 20 (current consumption of the freezer showcase 20). A state estimation apparatus 10 receives time-series data of a current value acquired by the sensor 30.

The state estimation apparatus 10 includes a current information acquisition part 101, an evaluation part 102, a current information storage part 103, a filter-cleaning practice judgement part 104, and an output part 105.

The current information acquisition part 101 acquires current information (time-series data of a current value) from the sensor 30 and temporarily stores the information in an internal buffer memory (not illustrated in the drawing).

The evaluation part 102 evaluates a degree of each change based on presently acquired power information of the freezer showcase 20, current information of the freezer showcase 20 when the filter is clean, retained in the current information storage part 103 in advance, and current information of the freezer showcase 20 previously acquired. Note that the degree of change may be quantitatively evaluated using a numerical value, or may be categorized (ranked) into large increase, small decrease, no change, etc. After the filter of the freezer showcase 20 is cleaned or replaced, the filter gets clogged over time and a power supply current of the freezer showcase 20 during operation generally increases with a lapse of time.

The filter-cleaning practice judgement part 104 estimates a clogged a clogged state of the filter 206 of the freezer showcase 20 based on the degree of change outputted by the evaluation part 102 to determine whether or not the filter cleaning has been practiced.

The output part 105 notifies (displays) a result determined by the filter-cleaning practice judgement part 104 (whether or not filter cleaning of the freezer showcase 20 has been practiced). The output part 105 may notify, via communication means, a store management terminal, a POS (Point of Sale) cashier terminal, or a mobile terminal for an employee or part-time worker that the filter cleaning of the freezer showcase 20 has been practiced.

With respect to the current information when the filter of the freezer showcase 20 is clean, which is retained in the current information storage part 103, the state estimation apparatus 10 may derive current information when the filter of the freezer showcase 20 is clean from the current information (the time-series data of a current value) acquired by the current information acquisition part 101 at a plurality of time points before determining whether or not the filter cleaning has been practiced, and store the information. Further, the current information may be waveform data of RMS (Root Mean Square) value of current, instead of an instantaneous alternating current. The current information storage part 103 may be a RAM, EEPROM, HDD, or the like.

The filter 206 of the freezer showcase 20 may be said to be in a clean state immediately after a start of operation, filter cleaning, or filter replacement.

During operation of the freezer showcase 20 immediately after cleaning of the filter 206 (or a filter replacement), the current information storage part 103 may receive the current information of the freezer showcase 20 acquired by the current information acquisition part 101 and store it as current information acquired when the filter 206 of the freezer showcase 20 is clean. In association with this current information, the current information storage part 103 may store flag information indicating that the current information was acquired when the filter 206 of the freezer showcase 20 was clean.

Alternatively, one may enter and set the current information when the filter of the freezer showcase 20 is clean from a control terminal (not illustrated in the drawing) and store the information in the current information storage part 103.

The current information, retained in the current information storage part 103, in order to determine whether or not the filter 206 of the freezer showcase 20 has been cleaned, acquired before determining whether or not cleaning of the filter 206 has been practiced (the state estimation practice time point) may be acquired on a regular basis, for example, every day, or every predetermined time period, and only the latest current information may be stored.

Alternatively, one may set in advance the timing to determine whether or not the filter 206 of the freezer showcase 20 has been cleaned (e.g., the month and the date) and current information may be acquired regularly from a predetermined period of time before that timing.

According to an example embodiment of the present invention, it is possible to determine whether or not cleaning of the filter 206 has been practiced, simply by measuring the power current information of the freezer showcase 20.

That is, there is no need to tinker with the freezer showcase 20 (modification is unnecessary), and it is easy for a store that already has the freezer showcase 20 installed to implement the present invention.

As illustrated in FIG. 2, a distribution board 40 is an example of the power supply part of the freezer showcase 20, which is connected to a branch wire (power supply line) 41 of the distribution board 40. The sensor 30 acquires current of the branch wire 41 of the distribution board 40 and forwards the current to the current information acquisition part 101 via a communication interface (not illustrated in the drawing) inside the sensor 30.

The sensor 30 may be a CT (Current Transformer) current sensor that converts measured current into a secondary current corresponding to the winding ratio, or a Hall element current sensor that converts a magnetic field generated around the measured current into a voltage utilizing the Hall effect. Alternatively, the current information acquisition part 101 may acquire, via the sensor 30, current at a power outlet of the freezer showcase 20, where the power outlet is a power supply part of the freezer showcase 20.

At a timing to determine whether or not cleaning of filter 206 of the freezer showcase 20 has been practiced (practicing state estimation), the current information acquisition part 101 may transmit, to the sensor 30, a measurement command to measure a current value and to transmit time-series data thereof. The sensor 30, based on the measurement command, may measure current of the freezer showcase 20 and transmit the measurement result to the current information acquisition part 101.

Timing for determining whether or not cleaning of the filter 206 has been practiced may have a certain time range. For example, if it is determined that the filter 206 has been cleaned, the next determination of whether or not cleaning of the filter 206 has been practiced may be made after a predetermined period of time has elapsed from the day the determination is made. Alternatively, if it is determined that the filter cleaning has not been practiced, a period from the day the determination is made to the day the determination is next made may be shortened. For example, assuming that an interval for determining whether or not to clean the filter 206 is one week, if it is determined that the filter cleaning has not been practiced on a day for the determination, for example, a next day may be set as a day for a next determination of whether the filter leaning has been practiced. In this case, the current information of the filter 206 of the freezer showcase 20 on the day when the determination is made is stored in the current information retaining part 103, because the day when the determination is made corresponds to a day before the next day when the determination will be made (a point in time when the status determination is practiced).

As for timing for determining whether or not to clean the filter 206, a timer not shown (system clock) or the like included in the status estimator 10 may be used to set a time until a next timing for determining whether or not to clean the filter, and when the timer times out, the current information acquisition part 101 sends a measurement command to the sensor 30. Upon time out of the timer, the current information acquisition section 101 may send a measurement command to the sensor 30 and obtain the measurement result (time-series data of a current value) of current of the freezer showcase 20 from the sensor 30.

Figure 3:
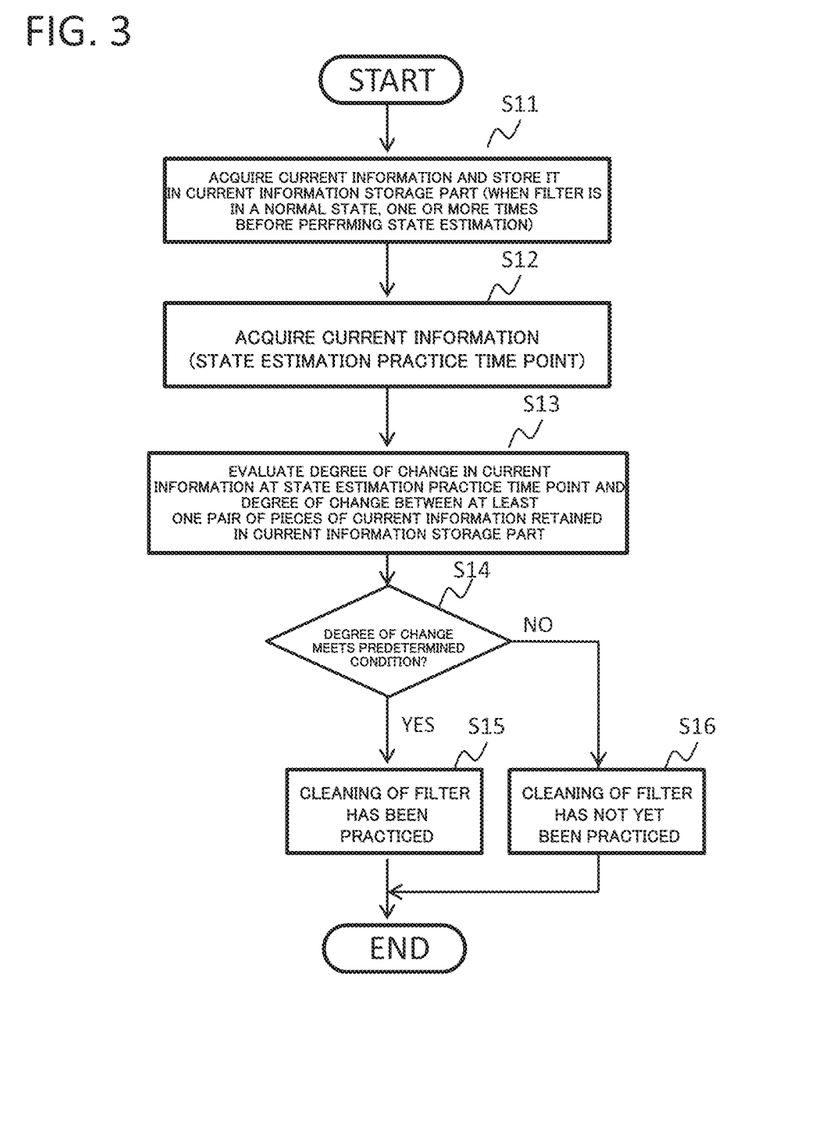
FIG. 3 is a flowchart explaining an example embodiment of the present invention.

FIG. 3 is a flowchart explaining the operation of the example embodiment. The current information acquisition part 101 acquires current information (time-series data of a current value (current waveform)) of the freezer showcase 20 and stores the current information in the current information storage part 103 (S11). As stated above, the current information of the freezer showcase 20 may be acquired at a regular time interval, or may be acquired at a regular time interval starting at a time point a predetermined period of time prior to a time point when state estimation is practiced.

The current information acquisition part 101 acquires the current information at a time when the state estimation is practiced (S12).

The evaluation part 102 evaluates a degree of change in the current information at the state estimation practice time point and a degree of change between at least one pair of pieces of current information acquired at different times and retained in the current information storage part 103 (S13) and determines whether or not each degree of change meets a predetermined condition (S14). In the step S13, the evaluation part 102 may evaluate a degree of change between the current information acquired at the state estimation practice time point (acquired presently) and the current information acquired in a state where the filter 206 is clean, and a degree of change between current information acquired at a different occasion before the present (the state estimation practice time point) and the current information acquired in a state where the filter 206 is clean, and determine whether or not each degree of change meets a predetermined condition in the step S14.

Alternatively, in the step S13, the evaluation part 102 may evaluate:

a degree of change between the current information acquired at the state estimation practice time point (acquired presently) and previously acquired current information; and a degree of change between at least one pair of pieces of current information acquired consecutively prior to the present state estimation practice time point, and determine whether or not each degree of change meets a predetermined condition in the step S14.

When each degree of change meets the condition (YES in S14), the filter-cleaning practice judgement part 104 infers that the filter 206 has been cleaned (cleaning was practiced between the state estimation practice time point and the current information acquisition time immediately before the state estimation practice time point) and determines that the filter cleaning has been practiced (S15). On the other hand, when the condition is not met, the filter-cleaning practice judgement part 104 determines that the filter cleaning has not been practiced (S16).

The evaluation part 102 may derive a trend in a degree of change in the current information based on a plurality of pieces of the current information acquired at different time points out of the current information that have been acquired until the state estimation practice time point after the filter 206 is cleaned and that are retained in the current information storage part 103. When the current information acquired at the state estimation practice time point deviates from the trend in the degree of change in the current information and approaches or matches the current information in a state where the filter 206 is clean, the filter-cleaning practice judgement part 104 may determine that cleaning of the filter 206 was practiced at a point in time before the state estimation practice time point between the state estimation practice time point and a time point when last current information used to derive the trend in the degree of change in the current information was acquired before the state estimation practice time point.

In the freezer showcase 20, clogging of the filter 206 affects operating efficiency of the air blower 208, the compressor 201, etc. A frequency of temperature control operation (intermittent operation) by the compressor 201 (constant speed operation system) varies according to change in the operation efficiency. Further, as the filter 206 gets clogged, a cooling load on the compressor 201 increases, and so does current (power) consumption. This applies in the same way to an inverter-controlled compressor 201.

When evaluating a degree of change in current information, the evaluation part 102 may detect an outlier in the acquired current information (time-series data). Alternatively, statistics comparisons may be used such as a correlation coefficient among the current information (current waveforms) or the maximum value of the current information.

As a simple example of an outlier, let x and µ be a sample to be tested (acquired current information) and a mean, respectively, and a test statistic is obtained by dividing the deviation x−µ by a standard deviation σ, $$\tau = \frac{x - \mu}{\sigma} \quad (1)$$

or the absolute value thereof is derived. If x is outside µ±2σ to 3σ, it may be deemed to be an outlier.

For example, with x[i] (i=1, ..., N) (N is the size of the time-series data (the number of samples)) as the current information acquired by the current information acquisition part 101 and an upper limit value $x_U[i]$ and a lower limit value $x_L[i]$ of the current at each time point (sample point) stored in advance in the current information storage part 103 when the filter 206 is in a normal state, the evaluation part 102 derives the following.

$$\tau[i] = \frac{|x[i] - (x_U[i] + x_L[i])/2|}{\sigma} \quad (2)$$

With respect to τ[i], when a predetermined index i, a specific i, or the sum of a predetermined number with respect to i is outside, for example, 2 to 3, the value x[i] with this i (or the sum with respect to i) may be deemed to be an outlier. The standard deviation σ may be calculated and stored when the current information in a normal state is retained in the current information storage part 103. Further, the standard deviation σ[i] may be calculated at each sample point or some representative points with respect to the standard deviation σ and used as σ in Equation (2).

The outlier detection method described above is an example of an elementary method, and it goes without saying that an outlier may be detected using a support-vector machine or the like such as k-means clustering, a typical cluster analysis method.

When the evaluation part 102 does not detect an outlier in the presently acquired current information (at the state estimation practice time point) from the current information acquired in a state where the filter is clean, but detects an outlier only from the current information acquired before the present state estimation practice time point, the filter-cleaning practice judgement part 104 may determine that cleaning of the filter 206 has been practiced.

Alternatively, the evaluation part 102 calculates a correlation value r (cross-correlation value) between current information x[i] (i=1, ..., N; time-series data of length N) acquired by the current information acquisition part 101 and current information y[i] (time-series data of length N) stored in advance in the current information storage part 103.

$$r = \frac{\frac{1}{N}\sum_{i=1}^{N}(x[i] - \bar{x})(y[i] - \bar{y})}{\sqrt{\frac{1}{N}\sum_{i=1}^{N}(x[i] - \bar{x})^2}\sqrt{\frac{1}{N}\sum_{i=1}^{N}(y[i] - \bar{y})^2}} \quad (3)$$

When the correlation value r between the current information acquired at the state estimation practice time point and the current information acquired in a state where the filter is clean is greater than the correlation value between the current information acquired before the state estimation practice time point and retained in the current information storage part 103 and the current information acquired in a state where the filter is clean, the filter-cleaning practice judgement part 104 may determine that cleaning of the filter 206 has been practiced. That is, the degree of change between the current information acquired at the state estimation practice time point and the current information acquired in a state where the filter is clean, indicates that the current information acquired at the state estimation practice time point is more similar to the current information acquired in a state where the filter is clean.

Alternatively, the evaluation part 102 calculates the difference $$d[i]=x[i]-y[i]$$

between the current information x[i] (i=1, ..., N; time-series data of length N) presently acquired (at a state estimation practice time point) and the current information y[i] (i=1, ..., N; time-series data of length N) acquired at each time point before the state estimation practice time point and retained in the current information storage part 103, and when a statistic of the difference (maximum, minimum, mean, etc.) between the current information x presently acquired (at the state estimation practice time point) and the current information acquired in a state where the filter is clean is smaller than a statistic of the difference d[i] between the current information x presently acquired (at the state estimation practice time point) and the current information y acquired before the present (the state estimation practice time point), the filter-cleaning practice judgement part 104 may determine that cleaning of the filter 206 has been practiced.

For the acquired current information x[i] (i=1, ..., N; the time-series data of a current value), the evaluation part 102 may derive an average over a predetermined period n $$\overline{x[j]} = \frac{\sum_{k=1}^{n} x[n(j-1)+k]}{n} \qquad (4)$$

(where j is a predetermined positive integer), and an accuracy may be improved by detecting an outlier or calculating a correlation value as described above for the average $\overline{x[j]}$.

Figure 4:
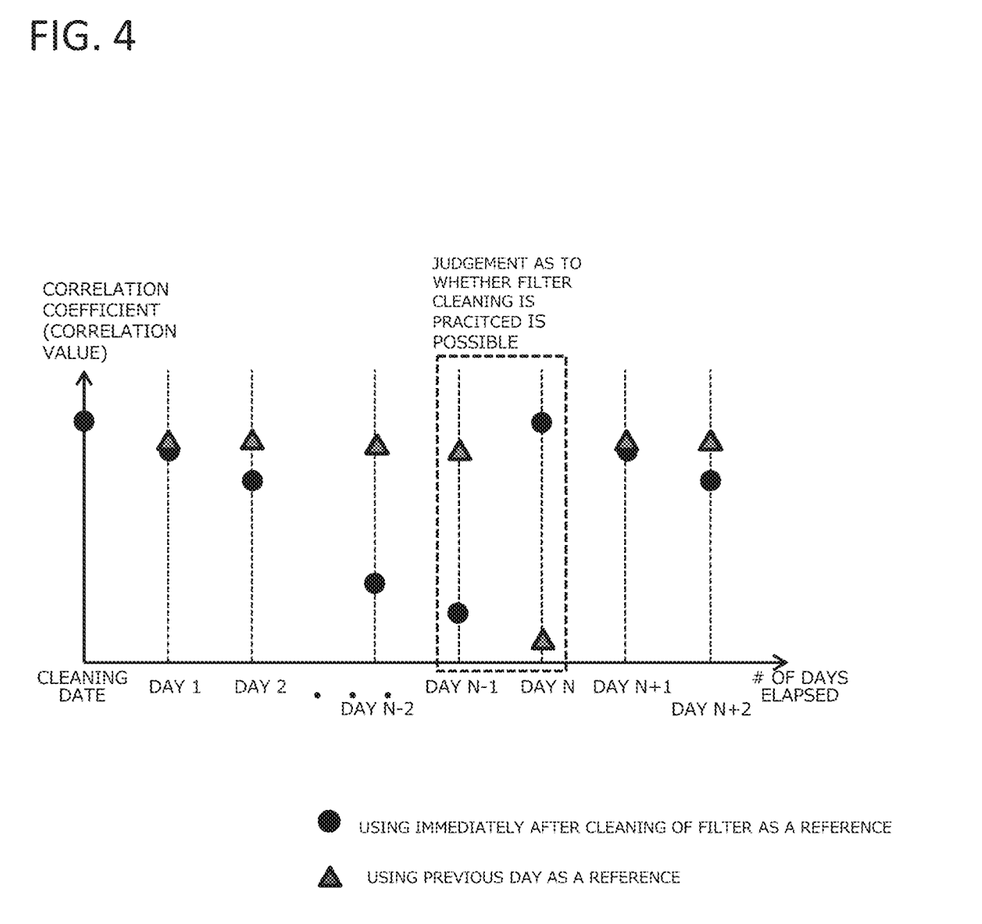
FIG. 4 is a flowchart for explaining an example of a process of determining whether or not a filter has been cleaned in an example embodiment of the present invention.

FIG. 4 is a diagram for explaining an example of the present example embodiment. Once a day, after cleaning of the filter 206 is practiced, the current information acquisition part 101 stores information of a power supply current (a current at a power supply part) of the freezer showcase 20 in the current information storage part 103. Alternatively, the current information acquisition part 101 may measure a power supply current of the freezer showcase 20 a plurality of times a day, every predetermined time period, and store one representative value out of a plurality of measured values of the power supply current, per day in the current information storage part 103.

The evaluation part 102 calculates a correlation value (indicated by; a correlation value using a value immediately after the filter is cleaned, as a reference) between each piece of the current information acquired before the state estimation practice time point and retained in the current information storage part 103 and the current information acquired in a state where the filter 206 is clean (the current information acquired on a day the filter is cleaned) and the correlation value (indicated by) between the current information acquired at the state estimation practice time point and the current information acquired in a state where the filter 206 is clean (the current information acquired on a day the filter is cleaned).

When the correlation value between the current information at the state estimation practice time point (Day N) and the current information acquired in a state where the filter 206 is clean (the current information acquired on a day the filter is cleaned) turns to increase from a decreasing trend (the power current correlation value relative to the current information of the filter cleaning date decreases over time) of the correlation values between each piece of the current information up until Day N−1, retained in the current information storage part 103, and the current information acquired in a state where the filter 206 is clean (the current information acquired on a day the filter is cleaned), i.e., when the correlation value approaches 1, the filter-cleaning practice judgement part 104 determines that the filter 206 has been cleaned. That is, the filter-cleaning practice judgement part 104 determines that the filter 206 was cleaned at some point of time between the state estimation practice time point and the last time current information was acquired.

Alternatively, the evaluation part 102 calculates a correlation value, using, as a reference, previous current information (indicated by; a correlation value with a value immediately before used as a reference) between each pair of pieces of current information acquired consecutively and retained in the current information storage part 103, and further calculates a correlation value (indicated by) between the current information acquired at a state estimation practice time point (Day N) and the current information acquired one day before the state estimation practice time point (Day N−1).

When the correlation value between the current information acquired at the state estimation practice time point (Day N) and the current information acquired one day before the state estimation practice time point (Day N−1) turns to decrease, from a trend of the correlation values between each pair of pieces of current information acquired consecutively after the filter 206 is cleaned, i.e., the current waveforms on Days N−1 and N are dissimilar, the filter-cleaning practice judgement part 104 determines that the filter 206 has been cleaned. That is, the filter-cleaning practice judgement part 104 determines that the filter 206 was cleaned at a time point between the state estimation practice time and a time point of acquiring current information one day before the state estimation practice time point, for example. A pair of pieces of current information (current waveforms) acquired consecutively are, with the current information acquired immediately before, used as a reference, similar to each other, and the correlation values exhibit a small change over time until Day N−1. Once the filter 206 is cleaned, the current information becomes dissimilar between Day N−1 (a day before the filter 206 is cleaned) and Day N, and the correlation value decreases significantly.

In the example embodiment described above, the current information acquisition part 101 acquires information of current flowing through the power supply part of the freezer showcase 20, from the sensor 30. The current information acquisition part 101 may acquire power information at the power supply part of the freezer showcase 20, calculate (estimate) current information from the power information, and provide the current information to the evaluation part 102. In a three-phase three-wire system, for power P, current I, and voltage V, the simplest calculation P=√3×I×V×cos θ (cos θ is the power factor) can be used (I=P/(√3×V×cos θ)).

Figure 5:
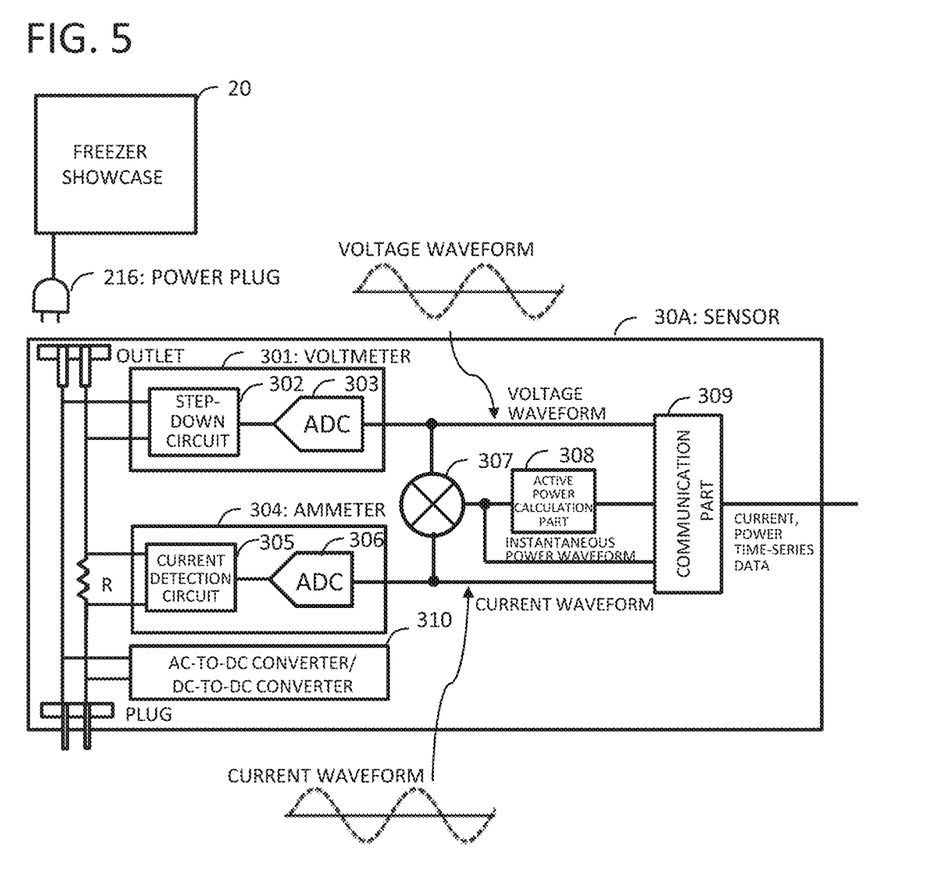
FIG. 5 is a drawing illustrating another example of a sensor.

FIG. 5 is a diagram illustrating an example of a sensor 30A that measures a power of the power supply part of the freezer showcase 20. In this case, the power supply part of the freezer showcase 20 is a power plug 216. Referring to FIG. 5, the sensor 30A includes a power outlet into which the power plug 216 is inserted and further includes a voltmeter 301 that measures a voltage across terminals of the power outlet and an ammeter 304 that measures current. The voltmeter 301 includes a step-down circuit 302 that steps down a terminal voltage and an analog-to-digital converter 303 that converts an analog output voltage of the step-down circuit 302 to a digital signal. The ammeter 304 includes a current detection circuit 305 that detects a current flowing through a power line (load) and an analog-to-digital converter 306 that converts an analog output voltage of the current detection circuit 305 to a digital signal. An instantaneous power waveform can be obtained by having, for example, a multiplier 307 multiply voltage waveform data from the analog-to-digital converter 303 of the voltmeter 301 by power waveform data from the analog-to-digital converter 306 of the ammeter 304. The instantaneous power waveform is smoothed out by an active power calculation part 308 to calculate an active power value. The voltage waveform data, the power waveform data, the instantaneous power waveform, and the active power value are supplied to a communication part 309. The communication part 309 transmits current time-series data (waveform data) or time-series data of the power values (waveform data) to the state estimation apparatus 10. At this time, the communication part 309 may transmit the time-series data (waveform data) of the current values and/or the time-series data (waveform data) of the power values when receiving the measurement command from the state estimation apparatus 10. In FIG. 5, an AC (Alternating Current) to DC (Direct Current) converter/DC to DC converter 310 generates DC power from AC power and supplies the DC power to the analog-to-digital converters 303 and 306, the multiplier 307, the active power calculation part 308, and the communication part 309.

FIG. 5 illustrates a single-phase two-wire AC system, however, measurement can be performed using, for example, three single-phase watt-meters in a three-phase three-wire AC system. Alternatively, a power may be measured based on the two-wattmeter method.

Figure 6:
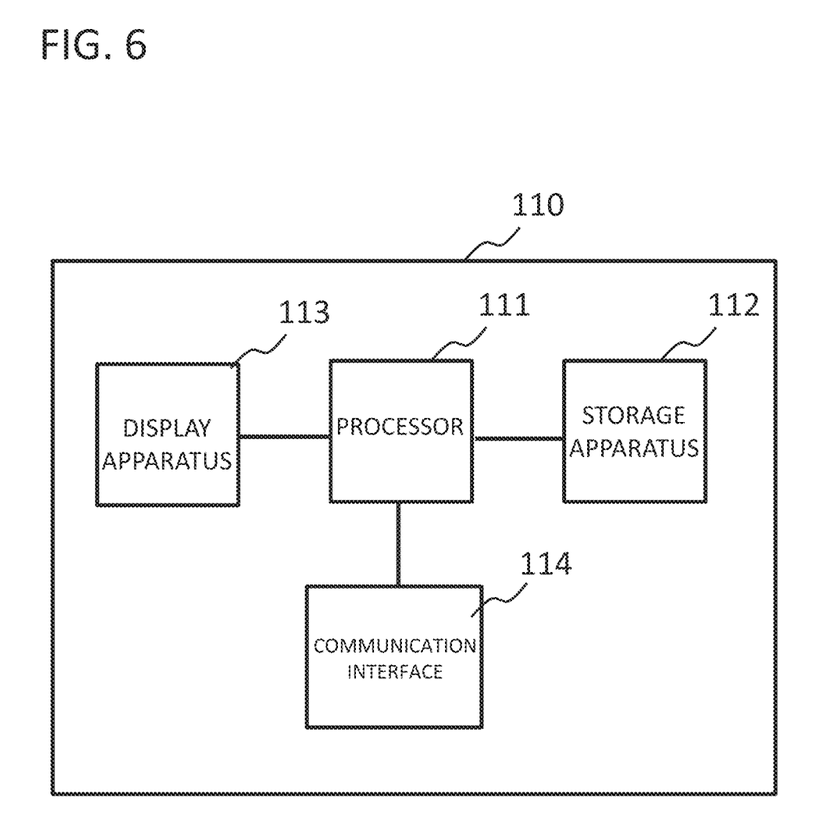
FIG. 6 is a drawing illustrating an example embodiment of the present invention.

Further, the state estimation apparatus 10 in FIG. 2 may be implemented in a computer apparatus, for example, as illustrated in FIG. 6. Referring to FIG. 6, a computer apparatus 110 such as a server computer includes a processor (CPU (Central Processing Unit), data processing apparatus) 111; a storage apparatus 112 that includes at least one of a semiconductor memory (e.g., RAM (Random Access Memory), ROM (Read-Only Memory), EEPROM (Electrically Erasable and Programmable ROM), etc.), HDD (Hard Disk Drive), CD (Compact Disc), and DVD (Digital Versatile Disc); a display apparatus 113; and a communication interface 114. The communication interface 114 functions as a communication part that acquires via a communication network the power/current information acquired by the sensor 30 in FIG. 2. The storage apparatus 112 may store a program that realizes the functions of the state estimation apparatus 10 in FIG. 2, and the state estimation apparatus 10 of the example embodiment described above may be realized by having the processor 111 read and execute the program.

In the example embodiment above, an example using a flat open showcase is described, however, the present invention, as a matter of course, can be applied to a vertical open showcase. Further, in addition to refrigeration/freezing open showcases, the present invention may be applied to other refrigeration/freezing facilities. In this case, depending on the type, use, capacity, scale, etc. of the refrigeration/freezing facility, the computer apparatus 110 in FIG. 6 may determine whether or not cleaning of the filter of the refrigeration/freezing facility has been practiced, based on a current waveform of the refrigeration/freezing facility obtained by disaggregating a composite current waveform flowing through the distribution board (40 in FIG. 2) into the waveform of each piece of equipment.

Further, each disclosure of PTLs 1 to 12 cited above is incorporated herein in its entirety by reference thereto. It is to be noted that it is possible to modify or adjust the example embodiments or examples within the whole disclosure of the present invention (including the claims) and based on the basic technical concept thereof. Further, it is possible to variously combine or select a wide variety of the disclosed elements (including the individual elements of the individual claims, the individual elements of the individual examples, and the individual elements of the individual figures) within the scope of the claims of the present invention. That is, it is self-explanatory that the present invention includes any types of variations and modifications to be done by a skilled person according to the whole disclosure including the claims, and the technical concept of the present invention.

What is claimed is:

1. A state estimation apparatus comprising:
    a communication interface that receives current information from a current sensor measuring a current at a power supply part of a refrigeration/freezing facility;
    a current information storage;
    a processor;
    a memory storing program instructions executed by the processor; and
    a display, wherein the processor is configured to:
    store current information of the refrigeration/freezing facility acquired in a state where a filter of the refrigeration/freezing facility is clean and current information of the refrigeration/freezing facility acquired one or more times at a predetermined time interval before state estimation is practiced in the current information storage;
    calculate a correlation value between the current information acquired at a state estimation practice time point and the current information acquired before the estimation practice time point retained in the current information storage;
    determine whether or not cleaning of the filter of the refrigeration/freezing facility has been practiced, between the state estimation practice time point and one previous state estimation practice time point, based on a degree of change at least between the correlation value calculated at the state estimation practice time point and a correlation value calculated at the one previous state estimation practice time point; and
    output the determination result on the display.

2. The state estimation apparatus according to claim 1, wherein the processor is configured to:
    calculate a correlation value between each of a plurality of pieces of the current information acquired at different time points and retained in the current information storage and the current information acquired in a state where the filter is clean, and a correlation value between the current information acquired at the state estimation practice time point and the current information acquired in the state where the filter is clean; and
    determine that cleaning of the filter has been practiced, when the correlation value between the current information acquired at the state estimation practice time point and the current information acquired in the state where the filter is clean, changes to increasing from a decreasing trend of the correlation values between each of the plurality of pieces of the current information acquired at the different time points and retained in the current information storage and the current information acquired in the state where the filter is clean.

3. The state estimation apparatus according to claim 1, wherein the processor is configured to:
    calculate a correlation value between each of one or more pairs of pieces of current information acquired consecutively and retained in the current information storage and a correlation value between the current information acquired at the state estimation practice time point and the current information acquired immediately before the state estimation practice time point; and
    determine that cleaning of the filter has been practiced, when the correlation value between the current information acquired at the state estimation practice time point and the current information acquired immediately before the state estimation practice time point, changes to decreasing, deviating from a trend of the correlation values between each of the one or more pairs of pieces of current information acquired consecutively and retained in the current information storage.

4. The state estimation apparatus according to claim 1, wherein the processor is configured to:
    detect an outlier in the current information acquired at the state estimation practice time point; and
    determine that cleaning of the filter has been practiced, when the current information acquired at the state estimation practice time point is determined to be the outlier only with respect to the current information acquired before the state estimation practice time point.

5. A computer-implemented state estimation method of a filter installed in a refrigeration/freezing facility, comprising:
- receiving current information from a current sensor that measures current at a power supply part of the refrigeration/freezing facility;
- storing in a current information storage current information of the refrigeration/freezing facility acquired in a state where the filter of the refrigeration/freezing facility is clean after the filter has been cleaned and current information acquired one or more times at a predetermined time interval after the filter is cleaned and before state estimation is practiced;
- calculating a correlation value between the current information acquired at a state estimation practice time point and the current information acquired before the estimation practice time point retained in the current information storage;
- determining whether or not cleaning of the filter of the refrigeration/freezing facility has been practiced, between the state estimation practice time point and one previous state estimation practice time point, based on a degree of change at least between the correlation value calculated at the state estimation practice time point and a correlation value calculated at the one previous state estimation practice time point; and
- outputting the determination result on the display.

6. The computer-implemented state estimation method according to claim 5, comprising:
- calculating a correlation value between each of a plurality of pieces of the current information acquired at different time points and retained in the current information storage and the current information acquired in a state where the filter is clean, and a correlation value between the current information acquired at the state estimation practice time point and the current information acquired in the state where the filter is clean; and
- determining that cleaning of the filter has been practiced, when the correlation value between the current information acquired at the state estimation practice time point and the current information acquired in the state where the filter is clean, changes to increasing from a decreasing trend of the correlation values between each of the plurality of pieces of the current information acquired at the different time points and retained in the current information storage and the current information acquired in the state where the filter is clean.

7. The computer-implemented state estimation method according to claim 5, comprising:
- calculating a correlation value between each of one or more pairs of pieces of current information acquired consecutively and retained in the current information storage and a correlation value between the current information acquired at the state estimation practice time point and the current information acquired immediately before the state estimation practice time point; and
- determining that cleaning of the filter has been practiced, when the correlation value between the current information acquired at the state estimation practice time point and the current information acquired immediately before the state estimation practice time point, changes to decreasing, deviating from a trend of the correlation values between each of the one or more pairs of pieces of current information acquired consecutively and retained in the current information storage.

8. The computer-implemented state estimation method according to claim 5, comprising:
- detecting an outlier in the current information acquired at the state estimation practice time point; and
- determining that cleaning of the filter has been practiced, when the current information acquired at the state estimation practice time point is determined to be the outlier only with respect to the current information acquired before the state estimation practice time point.

9. A non-transitory computer-readable medium storing a program that causes a computer to execute processing comprising:
- receiving current information from a current sensor that measures current at a power supply part of the refrigeration/freezing facility;
- storing in a current information storage current information of the refrigeration/freezing facility acquired in a state where the filter of the refrigeration/freezing facility is clean after the filter has been cleaned and current information acquired one or more times at a predetermined time interval after the filter is cleaned and before state estimation is practiced;
- calculating a correlation value between the current information acquired at a state estimation practice time point and the current information acquired before the estimation practice time point retained in the current information storage;
- determining whether or not cleaning of the filter of the refrigeration/freezing facility has been practiced, between the state estimation practice time point and one previous state estimation practice time point, based on a degree of change at least between the correlation value calculated at the state estimation practice time point and a correlation value calculated at the one previous state estimation practice time point; and
- outputting the determination result on the display.

10. The non-transitory computer-readable medium according to claim 9, wherein the program causes the computer to execute processing comprising:
- calculating a correlation value between each of a plurality of pieces of the current information acquired at different time points and retained in the current information storage and the current information acquired in a state where the filter is clean, and a correlation value between the current information acquired at the state estimation practice time point and the current information acquired in the state where the filter is clean; and
- determining that cleaning of the filter has been practiced, when the correlation value between the current information acquired at the state estimation practice time point and the current information acquired in the state where the filter is clean, changes to increasing from a decreasing trend of the correlation values between each of the plurality of pieces of the current information acquired at the different time points and retained in the current information storage and the current information acquired in the state where the filter is clean.

11. The non-transitory computer-readable medium according to claim 9, wherein the program causes the computer to execute processing comprising:
- calculating a correlation value between each of one or more pairs of pieces of current information acquired consecutively and retained in the current information storage and a correlation value between the current information acquired at the state estimation practice time point and the current information acquired immediately before the state estimation practice time point; and determining that cleaning of the filter has been practiced, when the correlation value between the current information acquired at the state estimation practice time point and the current information acquired immediately before the state estimation practice time point, changes to decreasing, deviating from a trend of the correlation values between each of the one or more pairs of pieces of current information acquired consecutively and retained in the current information storage.

12. The non-transitory computer-readable medium according to claim 9, wherein the program causes the computer to execute processing comprising:

detecting an outlier in the current information acquired at the state estimation practice time point; and determining that cleaning of the filter has been practiced, when the current information acquired at the state estimation practice time point is determined to be the outlier only with respect to the current information acquired before the state estimation practice time point.

* * * * *